US008823199B2

(12) United States Patent
Tull de Salis et al.

(10) Patent No.: US 8,823,199 B2
(45) Date of Patent: Sep. 2, 2014

(54) FLUID DRIVEN TURBINE

(76) Inventors: Rupert Stephen Tull de Salis, Ann Arbor, MI (US); Bryan Joseph Zaplitny, Brighton, MI (US); Roger Evans, Ann Arbor, MI (US)

( * ) Notice: Subject to any disclaimer, the term of this patent is extended or adjusted under 35 U.S.C. 154(b) by 124 days.

(21) Appl. No.: 13/304,538

(22) Filed: Nov. 25, 2011

(65) Prior Publication Data
US 2013/0134717 A1 May 30, 2013

(51) Int. Cl.
*F03D 9/00* (2006.01)

(52) U.S. Cl.
USPC .............................................. 290/55

(58) Field of Classification Search
USPC ..................................... 290/44, 55
See application file for complete search history.

(56) References Cited

U.S. PATENT DOCUMENTS

| | | | |
|---|---|---|---|
| 1,835,018 | A | 12/1931 | Darrieus |
| 4,329,116 | A | 5/1982 | Ljungstrom |
| 4,422,825 | A | 12/1983 | Boswell |
| 4,449,053 | A | 5/1984 | Kutcher |
| 5,375,324 | A | 12/1994 | Wallace et al. |
| 5,499,904 | A | 3/1996 | Wallace et al. |
| 6,672,837 | B1 | 1/2004 | Veldkamp et al. |
| 7,692,322 | B2 | 4/2010 | Wakasa et al. |
| 7,948,111 | B2 * | 5/2011 | Nigam et al. ............ 290/55 |
| 8,333,564 | B2 * | 12/2012 | Krivcov et al. ......... 416/223 A |
| 2004/0211598 | A1 | 10/2004 | Palidis |
| 2007/0048137 | A1 | 3/2007 | Hartman |
| 2008/0267777 | A1 | 10/2008 | Lux |
| 2010/0007144 | A1 * | 1/2010 | Nigam et al. ............ 290/44 |
| 2010/0133846 | A1 | 6/2010 | Lin et al. |
| 2010/0170164 | A1 * | 7/2010 | Leijon et al. ............ 52/40 |
| 2010/0172759 | A1 | 7/2010 | Sullivan |
| 2010/0230972 | A1 * | 9/2010 | Haar ................ 290/55 |
| 2011/0103950 | A1 | 5/2011 | Pesetski |
| 2011/0271608 | A1 | 11/2011 | Egan et al. |
| 2012/0063915 | A1 | 3/2012 | Kawabata et al. |

FOREIGN PATENT DOCUMENTS

| | | |
|---|---|---|
| CA | 1151072 | 8/1983 |
| DE | 3825241 | 10/1989 |
| EP | 1630415 | 3/2006 |
| FR | 2298707 | 8/1976 |
| GB | 494961 | 11/1938 |
| JP | S5770961 | 5/1982 |
| JP | 2003293936 | 10/2003 |
| JP | 2005083207 | 3/2005 |
| JP | 2006316751 | 11/2006 |
| SE | 533140 | 11/2008 |
| WO | WO9007647 | 7/1990 |
| WO | WO9535444 | 12/1995 |

(Continued)

OTHER PUBLICATIONS

International search report in a corresponding PCT application.

(Continued)

*Primary Examiner* — Truc Nguyen
(74) *Attorney, Agent, or Firm* — Shalom Wertsberger; Saltamar Innovations

(57) ABSTRACT

A fluid turbine comprises a rotor rotatable in use about an axis transverse to the direction of fluid flow. The rotor has a first part carrying a plurality of arcuate blades and a second part journalled in a base structure by means of two or more bearings. All the bearings are arranged on the same side of the blades so that the first part of the rotor is cantilever supported in the base structure.

11 Claims, 8 Drawing Sheets

(56) References Cited

FOREIGN PATENT DOCUMENTS

| WO | WO0244558 | 6/2002 |
| WO | WO2005061173 | 7/2005 |
| WO | WO2007140397 | 12/2007 |
| WO | WO2009130590 | 10/2009 |
| WO | WO2010021733 | 2/2010 |
| WO | WO2011109611 | 9/2011 |

OTHER PUBLICATIONS

U.S. Appl. No. 13/304,505 to De Salis et al., filed Nov. 25, 2011, titled "Fluid Driven Turbine Blade and Turbine Using Same".

* cited by examiner

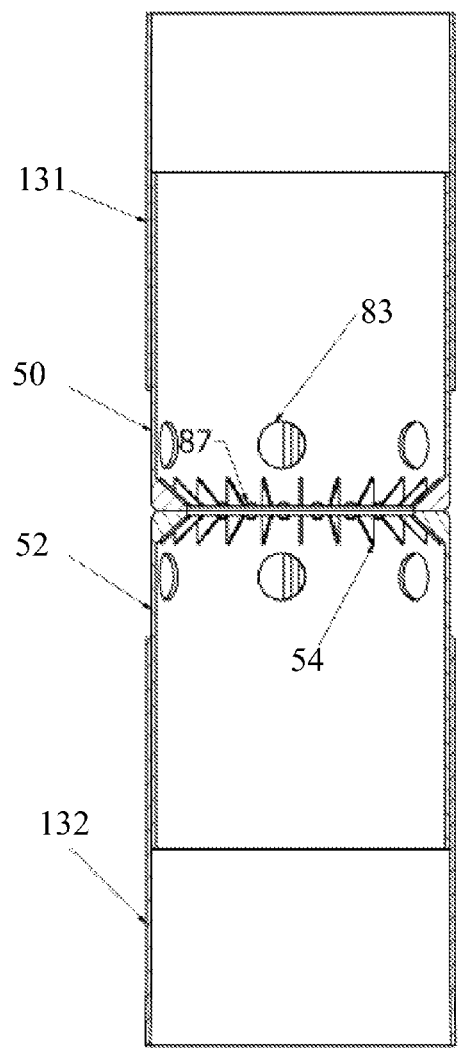
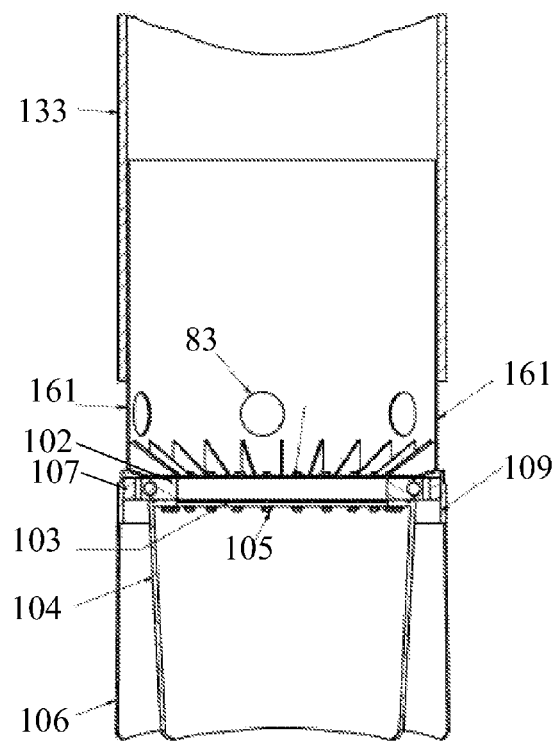
Fig. 4
Fig. 5

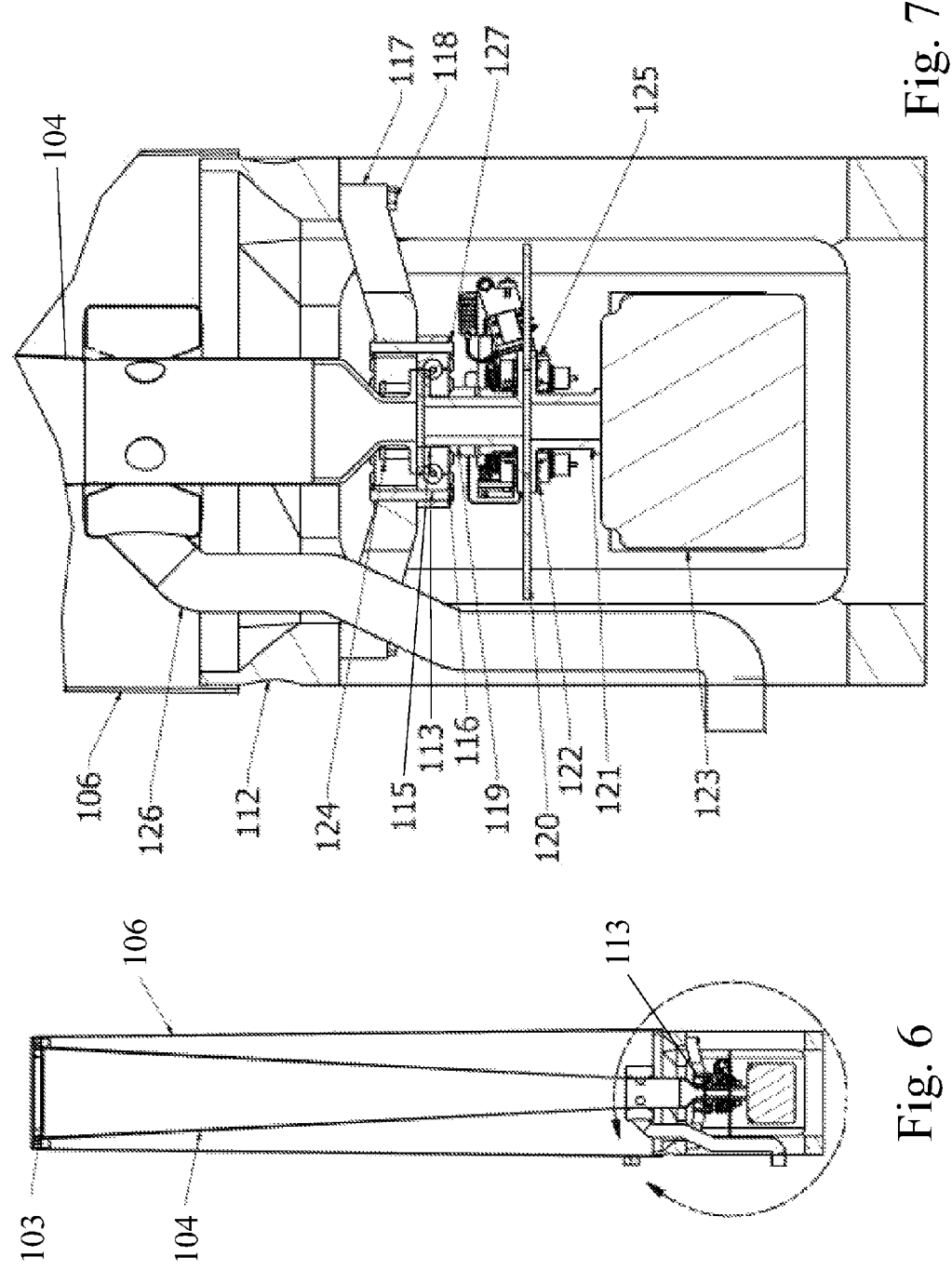

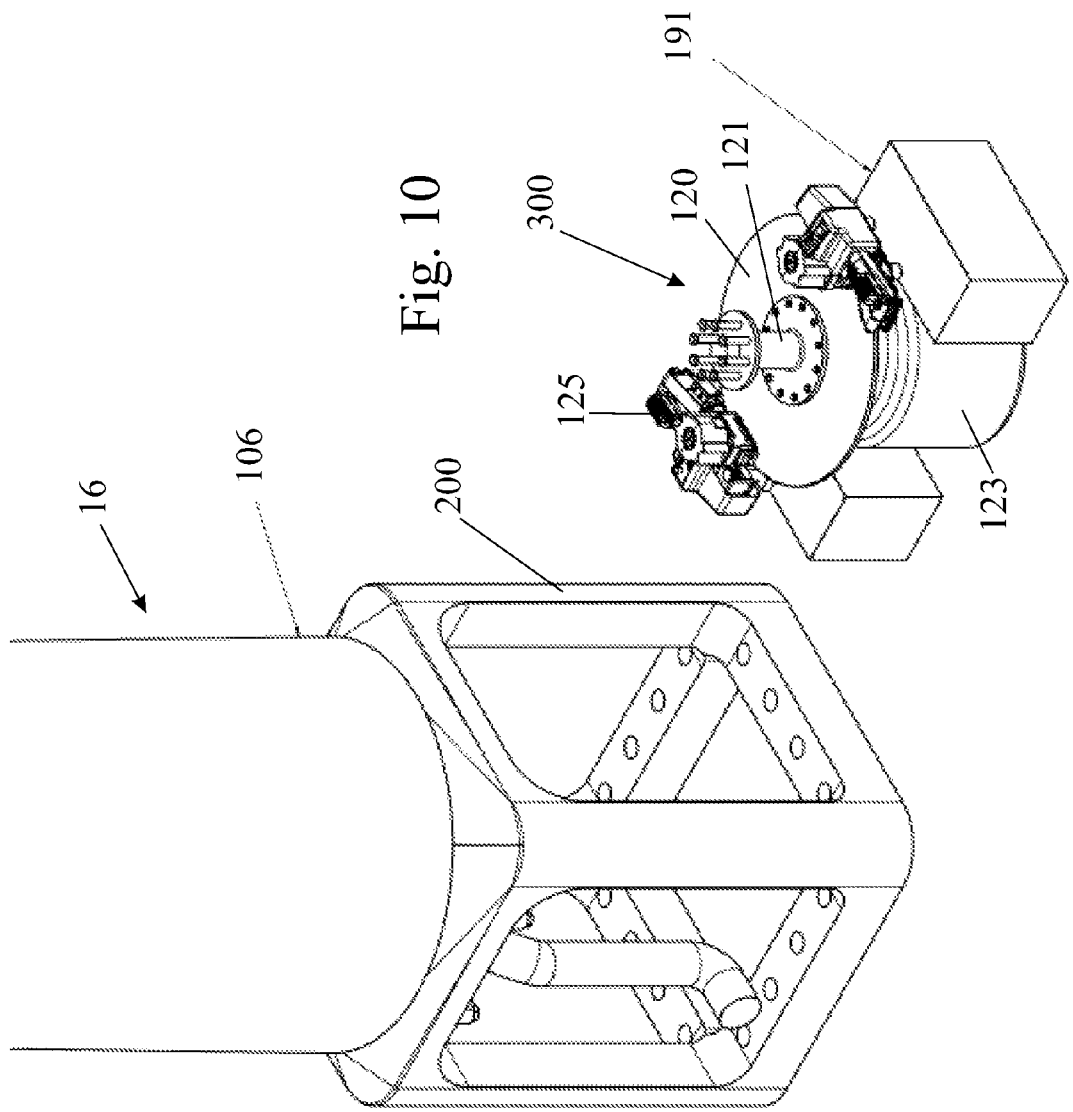

FLUID DRIVEN TURBINE

FIELD OF THE INVENTION

The present invention relates generally to turbines and more particularly to a fluid driven turbine for generating electrical power. Though the invention may be applied to liquid driven turbines, it is particularly beneficial for gas, more especially wind, turbines.

BACKGROUND OF THE INVENTION

Wind-powered electrical generators in current use commonly employ a horizontal-axis, propeller-like, wind turbine to capture power from air flowing parallel to the rotational axis of the turbine blades. However, as the wind direction can change, such turbines need to be mounted so that they may pivot about a vertical axis in order that they may face directly into the wind.

Aspects of the present invention, on the other hand, are based on a design of turbine known as a Darrieus wind turbine. In such turbines, the blades rotate about an axis perpendicular to the wind direction, and as such can be driven by wind from any direction, without the need for reorientation.

In 1931, G. J. M. Darrieus disclosed, in U.S. Pat. No. 1,835,018, a three-bladed wind turbine mounted on a vertical rotating shaft. Since that time, the Darrieus turbine has received substantial attention as an effective means of power generation.

Various configurations of generator and blades have been tried, but presented disadvantages in either placing the blades close to the ground, where wind speeds are low, or placing the generator and brakes at some height, making them inaccessible for maintenance purposes. Larger embodiments of the Darrieus design have required the use of guy wires to restrain lateral vibrations and high wind loadings, and these guy ropes occupy significant space around the turbines.

U.S. Pat. No. 4,449,053 discloses a vertical axis wind turbine of the Darrieus type with guy ropes, means for lubricating an upper bearing, and a hinged tower, for assembly on the ground before raising.

U.S. Pat. Nos. 5,375,324 and 5,499,904 disclose similar vertical axis turbines having the disadvantages that the blades extend close to the ground, where wind speeds are lower, and that guy ropes are required for support. They also have the disadvantage that a stationary tubular axle is required that passes through the inside of the rotating tube on which the blades are mounted, and supports it by at least one upper bearing and at least one lower bearing. This stationary axle, by virtue of its diameter which is smaller than that of the rotating tube, necessitates an inefficient usage of material, as its bending stiffness is inherently lower than that of a tube of similar weight and length but with a larger diameter and thinner walls.

U.S. Pat. No. 6,672,837 recognizes the problem of oscillations in wind turbines, and describes a method for damping oscillations in the nacelle of a horizontal axis wind turbine, this being a turbine where the fluid flow is parallel to the rotational axis. This makes use of a damping device that does not rotate with the blades, and is therefore unsuitable for the particular case of a vertical axis wind turbine of the type described below, where the most suitable mounting point for a damping device is on a rotating part of the turbine. It also addresses the oscillatory phenomena associated with blades that rotate about an axis parallel to the fluid flow, whereas the present invention relates to the problems associated with blades rotating about an axis perpendicular to the fluid flow, which include significant excitational forces at a frequency fn, where f is the first order rotational frequency of the turbine, and n is the number of blades. The '837 patent also addresses the case of a generator mounted in a nacelle at the top of a tower, an arrangement inherently more prone to lower frequency resonances, whereas aspects of the present invention relates to turbines with generator and/or other substantial components located at the base, resulting in higher frequencies of natural oscillation.

U.S. Pat. No. 7,692,322 recognizes the problem of oscillations in wind turbines, and describes a method for active damping of oscillations at the nacelle of a horizontal axis wind turbine. This patent has the disadvantage that it requires and depends upon reliable operation of electronically controlled sensors and expensive actuation hardware, which modify the pitch of the blades in order to counteract a detected oscillation.

U.S. patent application Ser. No. 13/304,505 to de Salis et al, which is incorporated herein by reference in its entirety, discloses certain types of blades for a fluid turbine, which may be advantageously used with various embodiments of the present invention.

SUMMARY OF THE INVENTION

In accordance with certain aspects of the present invention, there is provided a fluid turbine comprising a rotor rotatable in use about an axis transverse to the direction of fluid flow, the rotor having a first part carrying a plurality of arcuate or substantially arcuate blades and a second part journalled in a base structure by two or more bearings, wherein all the bearings are arranged on the same side of the blades whereby the first part of the rotor is cantilever supported in the base structure.

In an embodiment of the invention, the first part of the rotor is tapered, reducing gradually in diameter with increasing distance from the base structure.

Brakes acting on the rotor, a generator driven by the rotor and a control system for the generator and the brakes may conveniently all be contained within the base structure of the turbine. In this way, the heaviest items of the structure can be located at ground level to simplify installation and maintenance.

To further assist maintenance, it is convenient, in an embodiment of the invention, for the control system and generator to be removable from the base structure of the turbine as a sub-assembly, without the need to separate nor disconnect them from one another.

Advantageously, the sub-assembly may further incorporate one or more brake discs and one or more brake calipers.

It is desirable to measure the speed of the fluid and this may be carried out by mounting an anemometer on the rotor. A processing circuit may be used to compensate the output of the anemometer for the rotational speed of the rotor.

BRIEF DESCRIPTION OF THE DRAWINGS

Aspects of the invention will now be described further, by way of non-limiting examples, with reference to the accompanying drawings, in which:

FIG. 4 is a cross-section through the connection between the upper and middle sections of the rotor, FIG. 5 is a cross section through the connection between the lower end of the rotor and the drive shaft of the generator, FIG. 6 is a section through the support structure supporting the rotor, FIG. 7 shows the lower end of the section of FIG. 6 to an enlarged scale, FIG. 10 is a perspective view of the lower end of the support structure with the generator, brakes and control system removed as a sub-assembly.

DETAILED DESCRIPTION OF THE PREFERRED EMBODIMENT(S)

Figure 1:
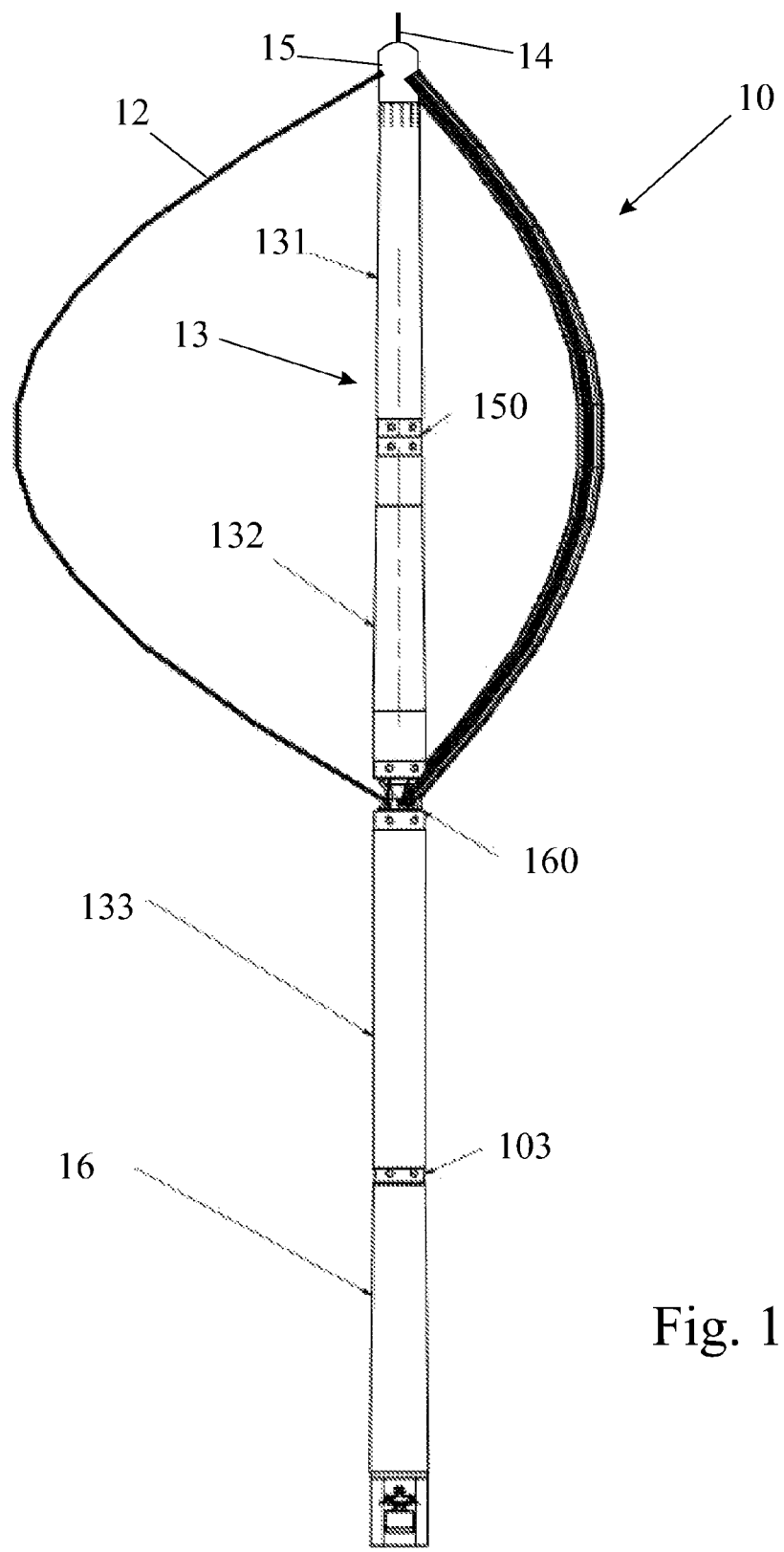
FIG. 1 is a side view of a wind turbine generator embodying the invention.
Figure 3:
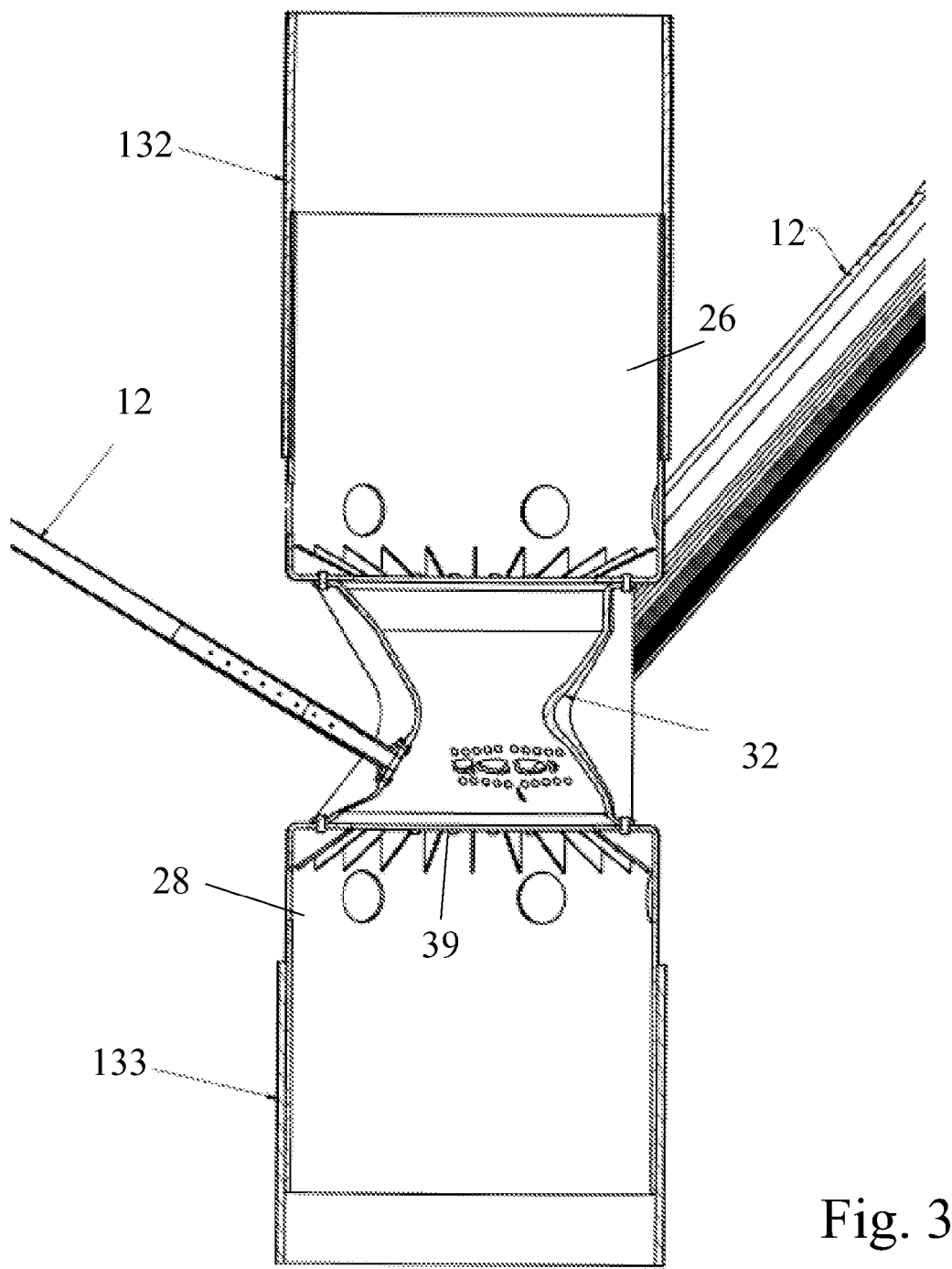
FIG. 3 is a section showing a preferred way to attach the lower ends of the blades to the rotor.

FIG. 1 shows a schematic side view of a wind turbine 10 embodying the invention. Three arcuate blades 12 of aerofoil cross-sectional shape are attached to a rotating, tapered, vertical rotor 13 made up of three sections 131, 132 and 133 that are jointed to each other. Each section is conveniently sufficiently small to be packed within a standard 45 ft shipping container (about 13.5 m), which can be easily transported by road, rail or sea. A preferred connection 150 between the sections 131 and 132 is shown in FIG. 4, while the connection 160 between the sections 132 and 133 is preferably made at the point of attachment of the lower ends of the blades 12 and is shown in FIG. 3.

The rotor is supported for rotation about a vertical axis by a support structure 16. When rotating in the presence of sufficient wind, the blades 12, by virtue of their shape, capture kinetic energy from the wind and convert it into rotational torque and motion, using principles such as laid out in U.S. Pat. No. 1,835,018.

An anemometer 14 is affixed to the top of the vertical rotor 13, for the purpose of sensing wind speed. While the anemometer may be of any convenient type, a rotating cup type anemometer is inexpensive, and is used in this example. If a rotating anemometer is used, the rotation is interpreted by an electronic control system that compensates for the rotational speed of the vertical rotor 13. An upper hub cover 15 is provided to cover the upper connections between blades 12 and vertical rotor 13.

Preferably, electrical connection to the anemometer is provided via a device known as a wireless brush (not shown), capable of transmitting electrical power and signals from a stationary device to a rotating shaft, without contact of moving parts.

All parts of the turbine that are situated above an upper bearing 103 are rotating elements, and they rotate together as one body about the vertical axis of the turbine, with the exception of the anemometer 14, which may rotate at a different speed.

Figure 2:
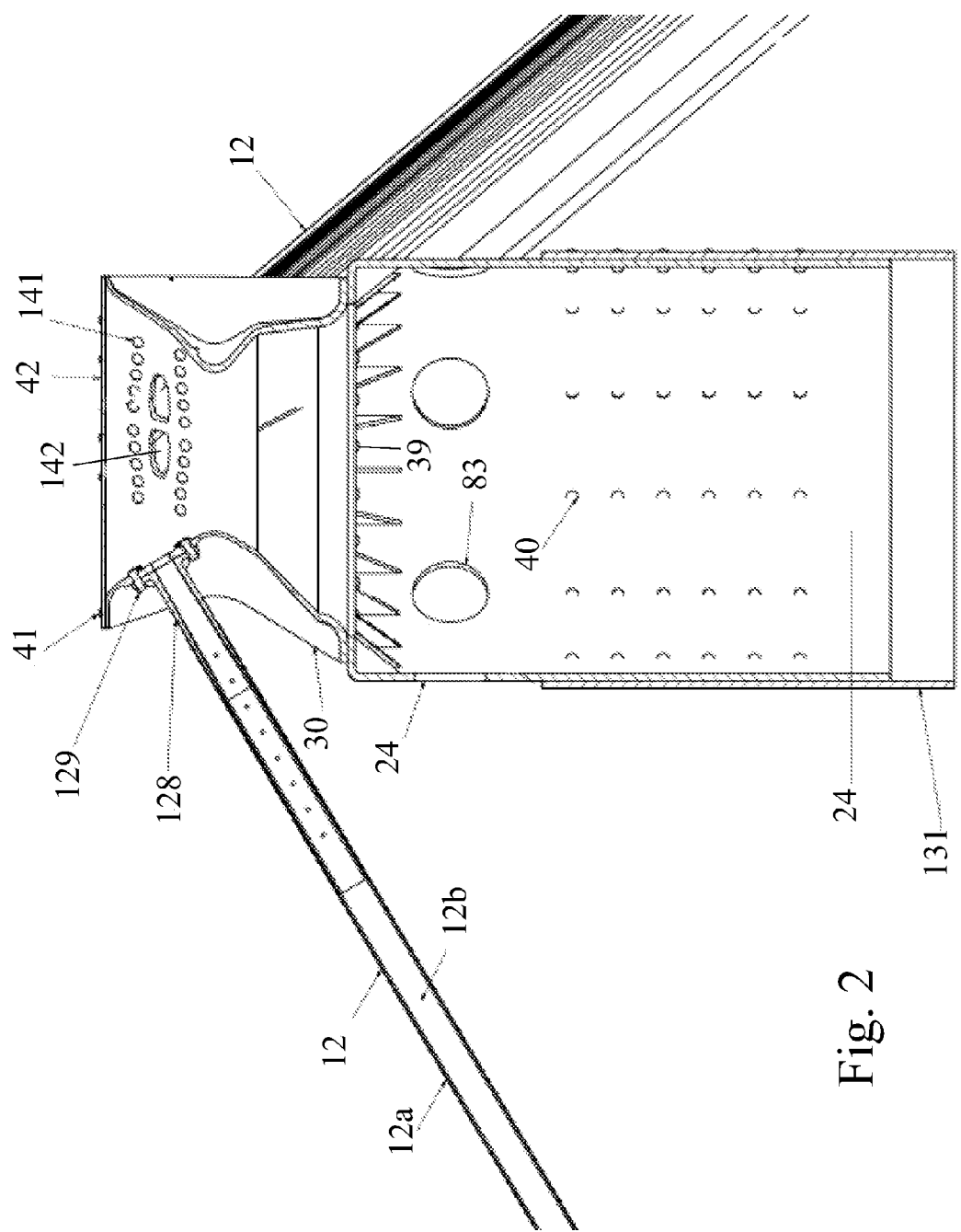
FIG. 2 is a section through the upper end of the rotor with a cover removed to reveal the hub at which the rotor is connected to the upper ends of the blades.

FIG. 2 shows a section through the upper part of the turbine rotor in the region where it is connected to the blades 12 with the hub cover 15 and the anemometer 14 removed. The rotor 13 is preferably formed from fiber reinforced plastic composite material, such as by of winding glass tape around a tapering cylindrical mandrel, with polymeric resin being infused into the tape. During or after winding, the composite material is affixed to metallic flanged tubes at the upper and lower ends of the rotor 13, the upper flanged tube 24 being shown in FIG. 2 and the lower flanged tube 26 being shown in FIG. 3. The flanged tubes 24 and 26 couple the rotor 13 to hubs 30 and 32 to which the upper ends and the lower ends of the arcuate blades 12, respectively are attached.

The sections 131 and 132 of the rotor may be affixed to the metallic flanged tubes 24 and 26 by rivets 40, and/or by adhesion or interlocking of fiber windings with protruding features of the flanged tubes 24, 26. Alternatively the rotor 13 may be formed by welding or riveting together of rolled plates formed from steel plate or other metal, or through pultrusion of tubing, then affixed to the flanged tubes 24 and 26.

The upper hub 30 is surmounted by a cap plate 42, for the purpose of stiffening, the cap plate 42 being affixed by any convenient manner, such as rivets, lock bolts or threaded fasteners 41, similar to fasteners 39 securing the hub 30 to the flanged tube 24.

The blades 12 are of hollow aerofoil cross section with an outer skin 12a and inner compartments 12b. The connection of each blade 12 to a hub 30 or 32 is carried out by a flanged connection piece 128 that fits in the compartments of the hollow blade 12. The flange at the end of the connection piece is secured by fasteners 129 passing through holes in the flange and aligned holes 141 in the hub 30. Additional holes 142 in the hub communicate with the compartments of the blades for the passage, for example, of control lines.

FIG. 3 depicts the lower hub 32 and connection details are similar except that instead of the cap plate 42 the lower hub is coupled to the sections 132 and 133 of rotor 13. Preferably rotor section 133 as well utilizes metallic flange tube 28, and any convenient manner may be utilized for securing the hub to the rotor sections, such as described for the top hub 30.

FIG. 4 show a section and a side view of the connection between the sections 131 and 132 of the rotor. The sections 131 and 132 are made of composite material and are joined to flanged metal tubes 50 and 52 by similar methods as described above for the flanged tubes 24, 26, and 28. As with the other flanged tubes, triangular brackets 54 reinforce the flanged metal tubes 50 and 52, and the tubes are joined to one another by any convenient manner such as rivets, lock bolts or threaded fasteners 87. The use of lock bolt fasteners, applied with hydraulically powered hand tools, provides a joint of dependable and known strength with reduced probability of operator error, when compared to threaded fasteners.

Hand holes 83 are provided for access with installation tools, to secure the fasteners. Similar methods are used at joining all three sections. After assembly, each of the joints is covered with a cylindrical cover sleeve (not shown), for the purposes of sealing and aesthetics.

FIG. 5 is a section through the connection between the lower section 133 of the rotor and a tapering drive shaft 104 that connects the rotor 13 to an electrical generator. This joint is effected by way of the upper bearing 103 that supports the rotor 13 in the support structure 16.

The lowermost section 133 of the rotor 13 is constructed of a composite material in the same manner as the other two sections and is connected to a metal flanged tube 161 having hand holes 83 that are once again covered by cylindrical sleeve (not shown) after assembly.

Fasteners 105 secure the flanged tube 161 to the inner race 102 of a ball or roller bearing 103, the outer race 107 of which bears against the inside of a base tower 106 of the support structure 16. The tower 106 is locally formed to provide a cylindrical surface 109 for this purpose. The fasteners 105 extend through the bearing inner race 102 and through the upper flange of a tapered tubular driveshaft 104. The driveshaft 104 serves the purposes of transmitting rotary motion to drive the electrical generator, and of restraining the rotor 13 and the parts attached thereto from overturning or lateral motion.

The outer race 107 of the bearing is not bolted or otherwise secured to an outer tube of the base tower 106, but is free to move a limited distance up and down vertically. This is to allow for dimensional mismatch and differential thermal expansion. Pins and slots or keys and keyways may be provided to prevent rotation of the outer race 107 of the bearing within the tower 106.

The base tower 106 is preferably made from steel or other metallic material, but may alternatively be made from a composite material or any other material.

FIG. 6 is a section through the base tower 106. The driveshaft 104 extends from the upper bearing 103, which restrains it in radial (horizontal) directions, to a lower bearing 113, which restrains it in both radial (horizontal) and axial (vertical) directions, and therefore supports the weight of all the rotating parts of the turbine.

Figure 9:
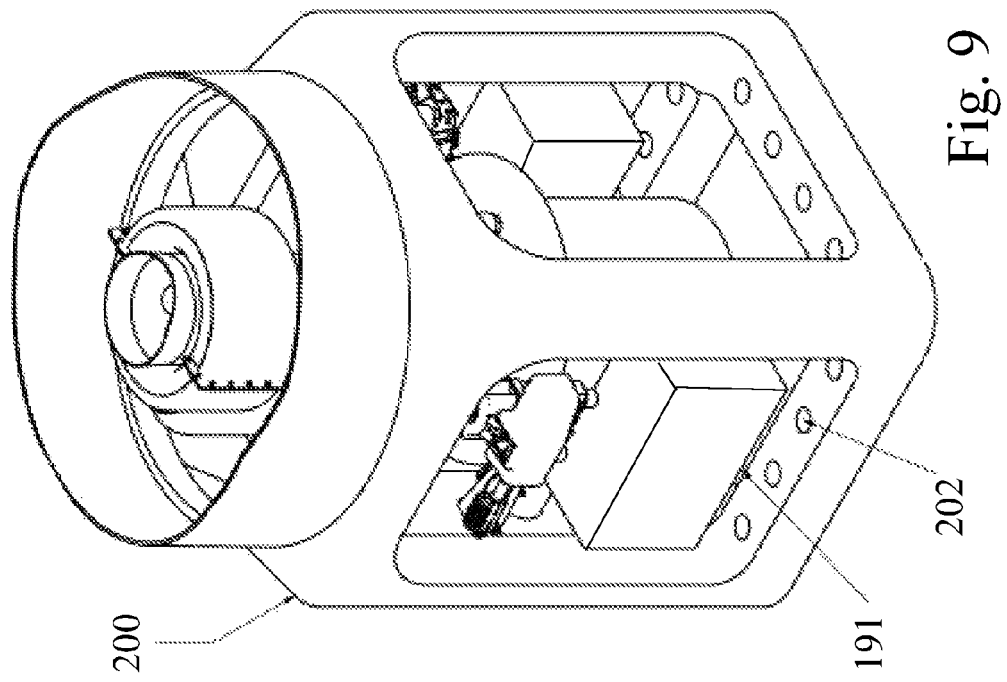
FIG. 9 is a perspective view of the lower end of the support structure.
Figure 8:
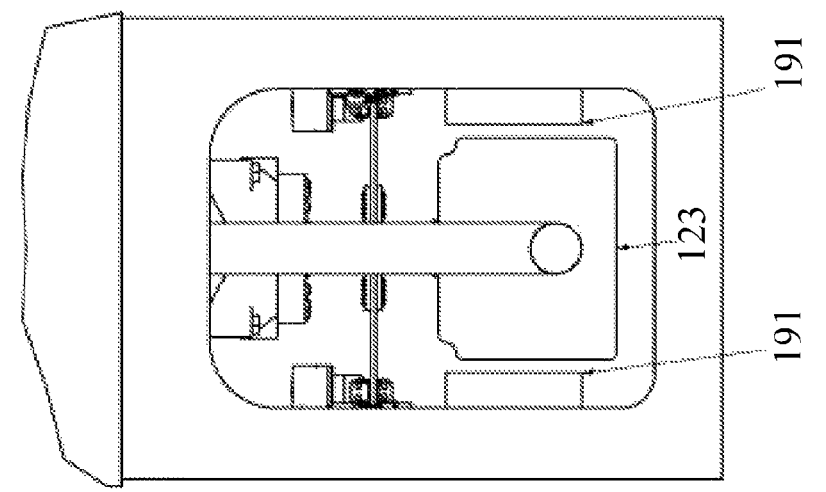
FIG. 8 shows the lower end of the support structure as viewed from the left in FIG. 7.

FIGS. 7 to 10 show different views of the lower end of the base structure 16. In particular, FIG. 7 is a vertical section, FIG. 8 is a side view, FIG. 9 is a perspective view from one side and FIG. 10 is perspective view from the other side with the sub-assembly of the generator, control system and brakes removed from the support structure.

The driveshaft 104, which is rotated by the force of the wind on the blades 12, extends downwards to the inner race 115 of the lower bearing 113, to which it is joined by fasteners 124. The fasteners 124 extend through the inner race 115 of the lower bearing and through a flanged connector 119, securing driveshaft 104, bearing race 115 and flanged connector 119 together. The flanged connector 119 transmits rotational torque to a second flanged connector 121, which is the rotational input shaft of a generator 123, thereby transferring rotational power, from the wind, through to the generator 123. The flanged connectors 119 and 121 are joined by fasteners 122, which pass through a brake disc 120. The brake disc 120 is engaged by two brake caliper assemblies used for the purpose of stopping the turbine. Only of the two calipers 125 is seen in FIG. 7 from which mounting details for the generator 123 and brake calipers 125 have been omitted for clarity.

The lower bearing 113 has an outer race 116 which is secured by fasteners 127 to a lower bearing carrier 117, which is in turn secured to a base frame 112 by fasteners 118.

Cabinets 191 house the turbine's control system. The base 200 of the support structure 16 has holes 202, through which substantial threaded fasteners secure the frame to steel fittings, embedded in and extending from concrete footings.

FIG. 10 shows the lower part of the turbine assembly during maintenance. The generator 123, control system 191, brake disc 120, brake calipers 125 and flanged connector 121, with other adjacent parts, are mounted together on a subframe (omitted for clarity) so that they can be removed, as a sub-assembly 300 away from the base 200 of the support structure 16, for purposes of maintenance or replacement. Another mechanism, such as a locking pin (not shown), is used to lock the turbine rotor in position when the sub-assembly is withdrawn from the base 200. This enables replacement, maintenance and diagnosis procedures to be carried out quickly and inexpensively.

As can be seen from FIG. 1, both the bearings in which the rotor 13 is journalled in the support structure 16 lie beneath the region where the lower ends of the blades 12 meet the rotor 13. In this way, the rotating section of the rotor 13 carrying the blades 12 is cantilever supported by the support structure 16.

Figure 11:
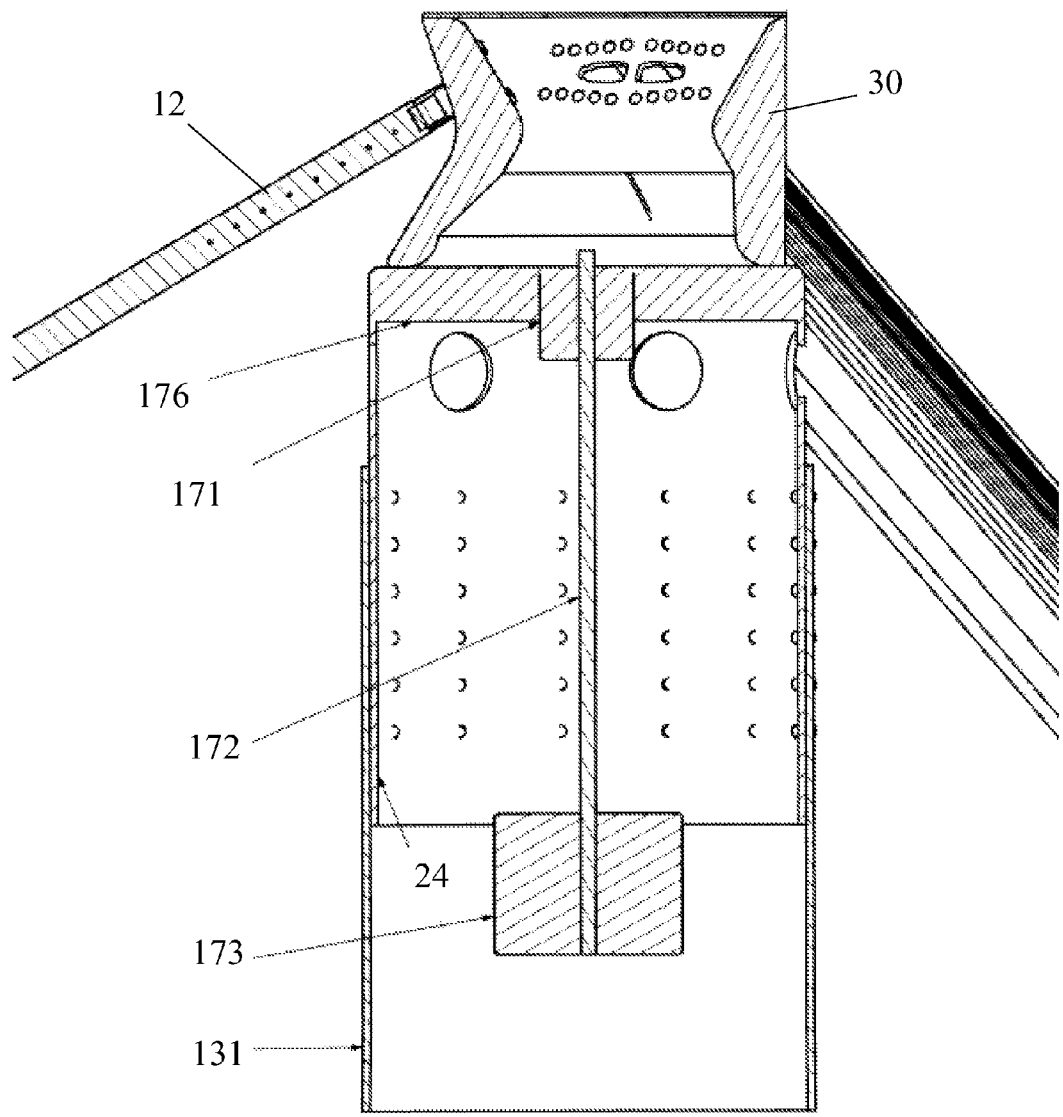
FIG. 11 is a view similar to that of FIG. 2 showing an embodiment of the invention fitted with a damper.

FIG. 11 shows a section through a modified upper hub. To avoid repetition, parts already shown in FIG. 2 and described above have been allocated the same reference numerals. The essential difference between the embodiment of FIG. 11 and that previously described resides in that a tuned mass damper (TMD) is suspended from the hub 30, the TMD comprising a mass 173, a spring shaft 172 and a mounting boss 171, supported by ribs 176 coupled into the upper end of the rotor 13.

This tuned mass damper is provided for the purpose of attenuating lateral resonant vibration of the turbine at a specific frequency, being the natural frequency of oscillation of the TMD itself.

The turbine itself is designed to have a first resonance mode at a higher frequency than the first order rotational excitation of the turbine at its maximum allowable speed. For example, if the turbine is able to rotate at a maximum speed of 60 RPM, then the first order rotational excitation would be at a frequency of 1 Hz, and the turbine would be designed with a first resonance mode (lateral bending) of greater than 1 Hz, to avoid first order rotational excitation. Therefore any exciting force arising from a rotational imbalance would not have a frequency high enough to excite a resonant bending of the turbine structure. However, the excitational force of the wind, applied to the blades, would occur at a third order frequency, three times that of the first order frequency, or in the case of a rotational speed of 60 RPM, at 3 Hz.

The TMD would be tuned to attenuate the first resonance mode of the turbine, which in the example is greater than 1 Hz, because this could be induced by the excitational force of the wind, even at a lower rotational speed that is too low to excite this mode through first order rotational excitation alone. In the example, the turbine might be designed with a resonant frequency of 1.5 Hz, and a maximum speed of 55 RPM. A wind force acting on three blades rotating at 30 RPM would provide an excitation force at a frequency of 1.5 Hz, matching the resonant frequency of the turbine, and possibly producing an undesirable vibration. The TMD would be designed to attenuate a lateral vibration of 1.5 Hz, and therefore would eliminate the undesirable vibration.

In another embodiment, the TMD may be provided with means for additional damping, to dissipate kinetic energy as heat and therefore reduce oscillations still further.

While the examples provided above utilize a wind turbine by way of convenient example, the skilled in the art would recognize that the principles disclosed hereinunder are applicable to other uses of the turbine, and that such may be utilized for other fluids, and in other combinations, orientations, and the like. Similarly, the skilled in the art will appreciate that the term 'arcuate' should be construed to include blade shapes which approximate an arc, or even be made of a plurality of straight blade sections joined together at an angle. It will further be recognized that while a tapering rotor is desired, it is not mandated.

The embodiments of the invention described above provide the following advantages:
  The blades may be situated at a significant height from the ground, taking advantage of higher wind speeds, while the generator and brakes are situated at or near ground level where they are easily accessible for maintenance.
  The visual form of the turbine may be rendered in an elegant, continuously tapered shape, comprising larger diameters at the lower end, for housing of the generator and added bending strength, and smaller diameters at the upper end, for reduced weight and wind drag.
  The generator and brakes and control system may be easily replaced with alternative models from other suppliers, there being adequate space to provide a selection of mounting methods in the base of the turbine, and with less stringent constraints on weight, compared with mounting locations in a conventional raised nacelle.

The upper rotating tube sections that support the blades may be formed in a weight-efficient manner, the structural wall material being disposed at the extreme diametral position of each tube, without a requirement for a stationary load-bearing support column inside the rotating tube and constrained to a smaller, and therefore less efficient, diameter. Surprisingly it is therefore possible to design the turbine with sufficiently high stiffness and low weight to prevent low frequency resonance.

One or more tuned mass dampers may be provided to attenuate the type of oscillations that could be induced under a combination of high wind conditions and certain rotational speeds, where the TMD(s) are matched to one or more resonant frequencies of the turbine structure. Surprisingly this method may be effective for all relevant resonant conditions despite the fact that the TMD(s) rotate with the rotation of the blades.

The central tubular structural parts of the turbine may be separated into four different sections, each of which fits inside a shipping container for purposes of transportation by road, rail, sea or air. The blades may also be transported in smaller subassemblies. Despite the smaller size of these sub-assemblies, the on-site assembly process is relatively simple.

All mechanical mechanisms and electronic controls of the turbine, with the exception of the anemometer, are located in the base section of the turbine, which can be pre-assembled and tested at a factory location before shipping. They can also be more easily protected against freezing because they are in close proximity, and they can be more readily accessed for maintenance.

The vertical rotor sections of the turbine are suitable for a cost-effective manufacturing process known as filament winding, in which glass fibers or other fibers are soaked in resin and wound around a large cylindrical mandrel, forming lightweight, strong structural parts.

Those parts of the turbine requiring greater structural strength and weight, particularly the base structure, brakes, generator, stationary tower and driveshaft, are located very close to the ground, and therefore facilitate higher resonant frequencies in the turbine assembly.

The structural advantages listed above surprisingly endow the turbine with sufficiently high stiffness and low weight to enable the rotor to be cantilever supported, without the need for guy wires.

The bearings are separated by a relatively large axial distance providing adequate space for bearing of adequate size to resist loads from the cantilevered rotor. They also allow relative axial movement between stationary and rotating parts at the upper bearing location, making provision for differential thermal expansion or strains related to wind loading without transferring significant additional axial forces to the bearings. These features are conducive to a long bearing life.

The design is modular in nature, and may be applied to turbines from a small size to a very large size.

Taking advantage of all the above features, the turbine may be built cost-effectively in large production runs, while also providing the inherent advantages of vertical axis turbines, that they do not need to be repeatedly re-oriented in the direction of the wind, they have few moving parts and they do not generate the characteristic undulating noise of horizontal axis turbines, associated with blades passing close to the mast.

The invention claimed is:

1. A fluid turbine comprising:
   a base structure having a plurality of bearings disposed therein; and
   a rotor having a first part and a second part that are rotatable about an axis transverse to the fluid flow, the first part carrying a plurality of substantially arcuate blades, and the second part being journaled in the plurality of bearings;
   wherein the plurality of bearings are arranged on the same side of the blades, whereby the first part of the rotor is cantilever supported by the bearings.

2. The fluid turbine of claim 1 wherein the first part of the rotor is tapered, reducing gradually in diameter with increasing distance from the base structure.

3. The fluid turbine of claim 1, wherein brakes, a control system and a generator are contained within the base structure.

4. The fluid turbine of claim 3 wherein the control system and generator are removable from the base structure as a sub-assembly.

5. The fluid turbine of claim 3 wherein the sub-assembly further incorporates at least one brake disc and at least one brake calipers.

6. The fluid turbine of claim 1 wherein a rotating anemometer is mounted to the rotor for the purposes of fluid speed sensing.

7. The fluid turbine of claim 6, wherein a processing circuit is provided to compensate the output of the anemometer for the rotational speed of the rotor.

8. The fluid turbine of claim 3 wherein the lowest resonant frequency of the turbine assembly is greater than the frequency of excitation caused by rotational imbalance in the blades and wind loading at all speeds permitted by the control system.

9. The fluid turbine of claim 1 wherein at least one of the plurality of bearing is substantially free to move axially relative to one of the rotor and the base structure while preventing the rotor from moving radially relative to the base structure.

10. The fluid turbine of claim 1 wherein a tuned mass damper is disposed on the same side of the bearings as the blades and is attached to the rotor for rotation with the blades, the tuned mass damper being designed to attenuate resonant vibrational motion of the blades and of the rotor.

11. The fluid turbine of claim 10 wherein a viscous or frictional damping mechanism is additionally provided for damping the motion of the tuned mass damper.

* * * * *